United States Patent
Belavskii

(10) Patent No.: US 12,390,944 B2
(45) Date of Patent: Aug. 19, 2025

(54) FRAME OF THE ROBOTIC COMPLEX

(71) Applicant: REXR, INC., Wilmington, DE (US)

(72) Inventor: Sergei Andreevich Belavskii, Moscow (RU)

(73) Assignee: REXR, INC., Wilmington, DE (US)

( * ) Notice: Subject to any disclaimer, the term of this patent is extended or adjusted under 35 U.S.C. 154(b) by 0 days.

(21) Appl. No.: 18/352,658

(22) Filed: Jul. 14, 2023

(65) Prior Publication Data

US 2024/0017428 A1     Jan. 18, 2024

(30) Foreign Application Priority Data

Jul. 18, 2022   (RU) .......................... RU2022119593

(51) Int. Cl.
  *B25J 21/00*   (2006.01)
  *B25J 19/00*   (2006.01)

(52) U.S. Cl.
  CPC ........... *B25J 21/00* (2013.01); *B25J 19/0025* (2013.01)

(58) Field of Classification Search
  CPC .... B25J 21/00; B25J 19/0025; B25J 19/0029; B23Q 37/007
  See application file for complete search history.

(56) References Cited

U.S. PATENT DOCUMENTS

| | | | | |
|---|---|---|---|---|
| 5,225,648 A * | 7/1993 | Torii | .................. | B23K 26/0884 901/42 |
| 5,459,925 A * | 10/1995 | Akeel | ...................... | B25J 9/102 475/344 |
| 8,127,687 B2 * | 3/2012 | Spangler | .............. | B65G 35/066 104/166 |
| 8,800,745 B2 * | 8/2014 | Spangler | .............. | B65G 35/066 198/465.4 |
| 2008/0178537 A1 * | 7/2008 | Spangler | ................ | B23Q 37/00 52/36.1 |
| 2021/0048291 A1 * | 2/2021 | Tahir | .................. | G01B 11/2518 |

FOREIGN PATENT DOCUMENTS

DE            10147360 A1    4/2003

OTHER PUBLICATIONS

Flexlink, Modular Belt Conveyors, https://www.flexlink.com/en/portfolio/conveyor-systems/modular-belt-conveyors (Publication Unknown) (Last Visited: Jul. 14, 2023).
Schubert, What Is the Secret of Our Success?, https://www.schubert.group/ru/tehnologia/ (Publication Unknown) (Last Visited: Jul. 14, 2023).

* cited by examiner

*Primary Examiner* — Jake Cook
(74) *Attorney, Agent, or Firm* — Perilla Knox & Hildebrandt LLP; Kenneth A. Knox

(57) ABSTRACT

A frame for supporting a robotic system includes various elements (or modules), particularly support modules with a cavity, where each support module is provided with holes at least in its upper part, and outputs for utilities are disposed within the cavity. A beam module is provided with holes and configured such that processing equipment can be mounted thereon. The support modules are connected to each other by means of the beam module such that the holes in the support modules are aligned with the end holes in the beam module, and the utility lines of the beam module are connected to outputs of the support modules. The configuration thereof provides effective integration and assembly of the supporting frame for a robotic system at a manufacturing site, for instance, without stopping production.

8 Claims, 3 Drawing Sheets

FRAME OF THE ROBOTIC COMPLEX

CROSS-REFERENCE TO RELATED APPLICATION

This application claims the benefit of and priority to Russian Federation patent application No. 2022119593 filed Jul. 18, 2022, the contents of which being incorporated by reference in its entirety herein.

TECHNICAL FIELD

The present disclosure relates to robotic systems and, in particular, to their structural elements, more specifically to frames of robotic systems.

BACKGROUND

Designing and production of robotic systems to meet varying customer requirements require significant labor costs and are associated with the risks when ensuring operability using modified and newly designed structures.

One of the methods to reduce such costs and risks is the creation of systems based on the principles of unification. There are several levels of unification:

1. Using process technologies with unified processing operations. In this case, a structure is designed for a process, but with a construct that is configured to be used within a specified system.

2. Using enlarged unified elements, i.e. modules (units). Here, robotic systems are created by combining modules of required types in the required quantity and additional elements. An example of such unification can be a set of Schubert welded frame modules (https://www.schubert-.group/ru/tehnologia/sistemnye-komponenty.html).

3. Using a set of unified elements to be combined in various configurations so that to obtain modules of a required design. When creating a robotic system, such modules in the required quantity can be included in it together with additional elements. An example of such unification can be conveyor modules based on elements of the Flexlink conveyor system (https://www.flexlink.com/ru/home/products-and-services/stainless-steel-conveyor-systems/modular-wide-belt).

Various components of the system may have different levels of unification, which is important for ensuring its overall economical efficiency and flexibility. Thus, enlarged elements as a whole tend to be less costly to manufacture as the unification requires additional interfaces and associated costs as well as to have lower performance. On the other hand, less flexibility leads to an increase in costs and risks when refining and designing new elements if it is impossible to adopt the existing unified elements for use. Technological unification has less potential for savings, but it gives much more flexibility and reduces performance to a lower extent.

In view of the fact that the introduction of automation often takes place at existing production sites where manual labor used to be utilized, it is very important to provide an opportunity to install robotic systems at the locations where delivery of large-sized structures was not expected previously, while doing this in cramped conditions over the production line between work shifts.

One of the largest structures in a frame-based robotic system is the frame itself. To ensure high transportability and assembly characteristics, the frame can be made from smaller elements. However, the frame is not only a base for fastening other elements, but also a support for laying utility lines between them and external connections. This fact requires that the passage of these utility lines and their rational division should be taken into account.

The task of dividing the frame into elements that are easy to mount is much more complicated when using modules made up of mechanically unified elements. The variety of options for utility lines leads to the fact that they must be installed upon completion of establishing mechanical connections therebetween. When laying utility lines on-site, duplication of work occurs since first the utilities are laid at the manufacturing plant to check their operability, then they are dismantled and afterwards are mounted again on-site. At the same time, the installation of utility lines on-site in Spartan conditions is a labor-intensive operation, and ensuring its quality during operation is very complicated.

The prior art knows a packaging machine, including a conveyor installed between two rows of columns, disclosed in patent DE 10147360, published on Apr. 24, 2003, IPC B65B5/06, B65B5/00, B65B65/00. Equipment, such as robotic arms, in the known device are mounted and connected by means of horizontal beams below the level of the conveyor. Each module of the known device contains four columns 5a-d connected by crossbars (beams) 26 and 27 and is installed at manufacturing site already assembled. Separate crossbars 26 are designed to be openable so that to enable access to equipment located inside, that requires additional protection against dust and dirt, for example, by using hydraulic or pneumatic actuators and electrical communications. The crossbars 27 are made openable from the ends to facilitate the placement of utilities.

The device disclosed in DE 10147360 can be selected as the closest prior art. The disadvantages of the known solution is the usage of large-sized unified elements that are delivered to the production line being assembled, wherein all the utility lines shall be mounted upon completion of the frame installation, which in turn requires a stoppage of production for the time of installation of the frame and utilities.

BRIEF SUMMARY

The technical problem to be solved by the present disclosure is the creation of a flexible unified frame of a robotic system.

The technical result to be achieved when using the claimed frame of a robotic system is to universalize and simplify the assembly of the frame of a robotic system at manufacturing site without suspension of production.

The technical problem is solved, and the technical result is achieved due to the fact that the frame of a robotic system configured as a modular one includes: at least two support modules made in the form of columns with a cavity, wherein each support module is provided with holes at least in its upper part, and outputs for utilities are disposed within the cavity; and at least one hollow beam-like module provided with end holes and configured such that the processing equipment may be mounted thereon, wherein utility lines equipped with outputs are laid inside the beam-like module, wherein the support modules are connected to each other by means of a beam-like module such that at least part of the holes in the support modules is aligned with the end holes in the beam-like module, and such that utility lines of the beam-like module may be connected to the outputs of the support modules.

Implementation of the frame as a modular one to be made up of universal support and beam-like modules connected to each other enables maximum flexibility and ease of assembly without stopping the production line, since the delivery of individual frame modules to the installation site does not require any large-sized machinery or equipment. Preliminary placement of utility lines in the modules and bringing out their outputs also simplifies and speeds up the installation. A required number of support and beam-like modules for the frame is mounted depending on the shape and length of the production line, which again has a positive effect on the flexibility and versatility of the proposed frame of a robotic system.

The technical problem is solved, and the technical result is achieved also in the following specific embodiments of the frame of a robotic system.

The frame may include a second hollow beam-like module.

At least one beam-like frame module may be provided with additional holes, wherein at least a part of these additional holes can be configured to bring out utility lines.

Provision of a second hollow beam-like module for connecting the support modules both increases the rigidity of the connection, which is very important and makes it possible to use a smaller number of support modules in the overall design under conditions of a great variety of possible frame configurations, and enables dividing utility lines, for example, depending on the tasks they solve, which, in turn, affects the ease of assembly and increases the versatility of the frame. Provision of additional holes in the beam-like modules makes it possible to place all the necessary utilities and related equipment (for example, displays, indicator panels, control panels, etc.) simultaneously and in a compact manner without installing additional modules only responsible for placement of additional equipment.

The utility lines configured to be connected to the outputs for utilities may be laid within the cavity of at least one support module of the frame.

The support module of the frame with utility lines laid in its lower part can be provided with at least one additional hole configured for bringing out the utility lines, and the utility lines of the support module can be provided with outputs.

The fact that utility lines may be disposed not only in the beam-like modules but also inside the support modules and are configured to be brought outside ensures the overall compactness, flexibility and versatility of the frame of a robotic system, and also speeds up and simplifies its assembly, since the need for additional structures to connect utility lines that can interfere with both the operation of the production line, and the work of personnel is eliminated.

BRIEF DESCRIPTION OF THE DRAWINGS

Hereinafter the present disclosure will be described with reference to the following accompanying drawings, where.

DETAILED DESCRIPTION

Figure 1:
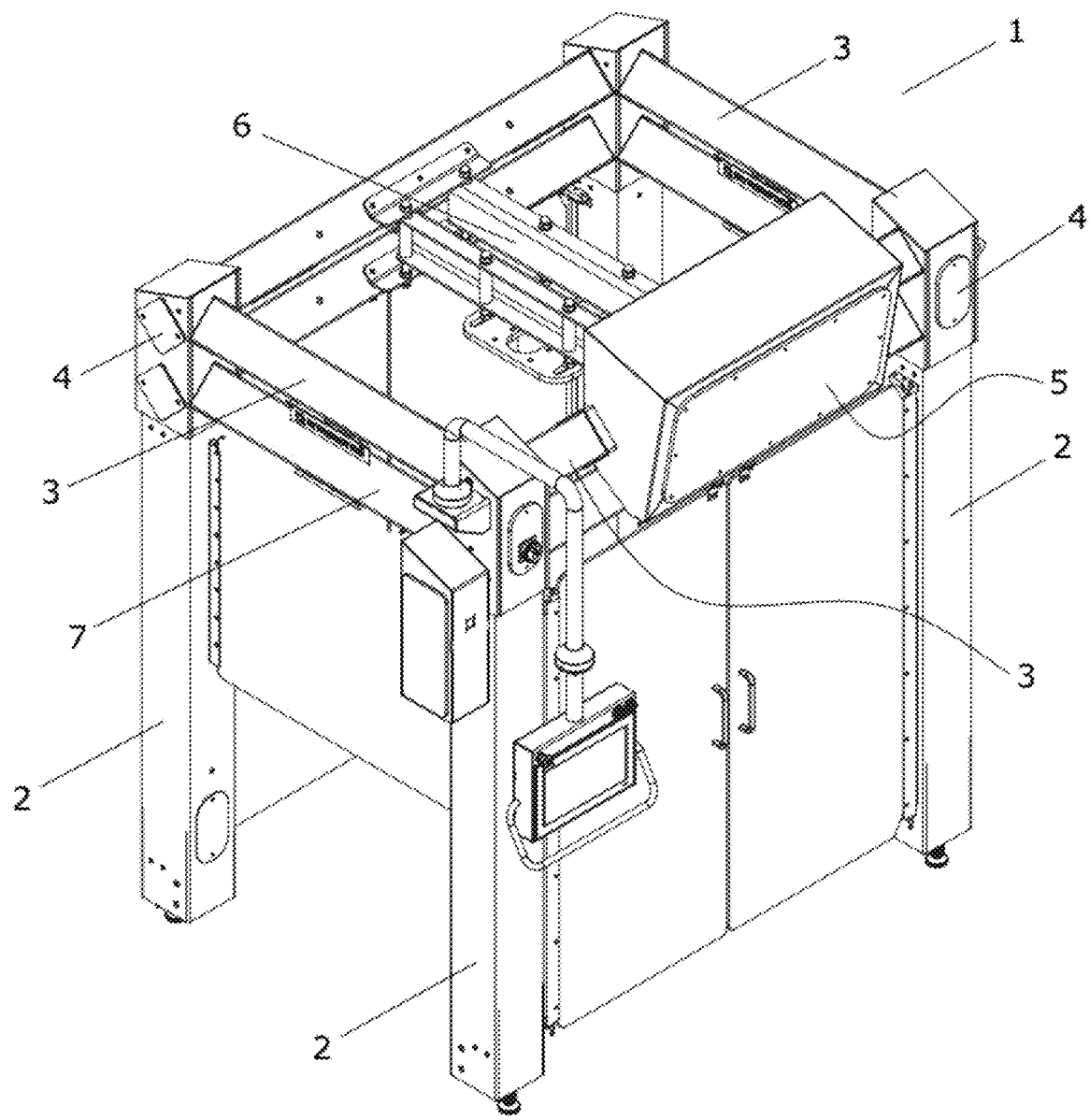
FIG. 1 shows an example of the overall view of an embodiment of the frame of a robotic system.
Figure 3:
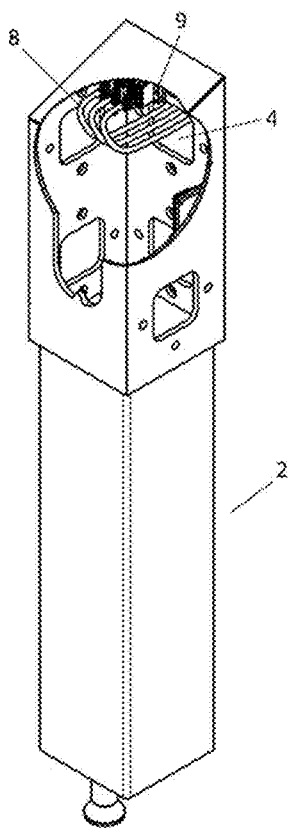
FIG. 3 shows an exemplary implementation of a support module of the frame of the robotic system.
Figure 4:
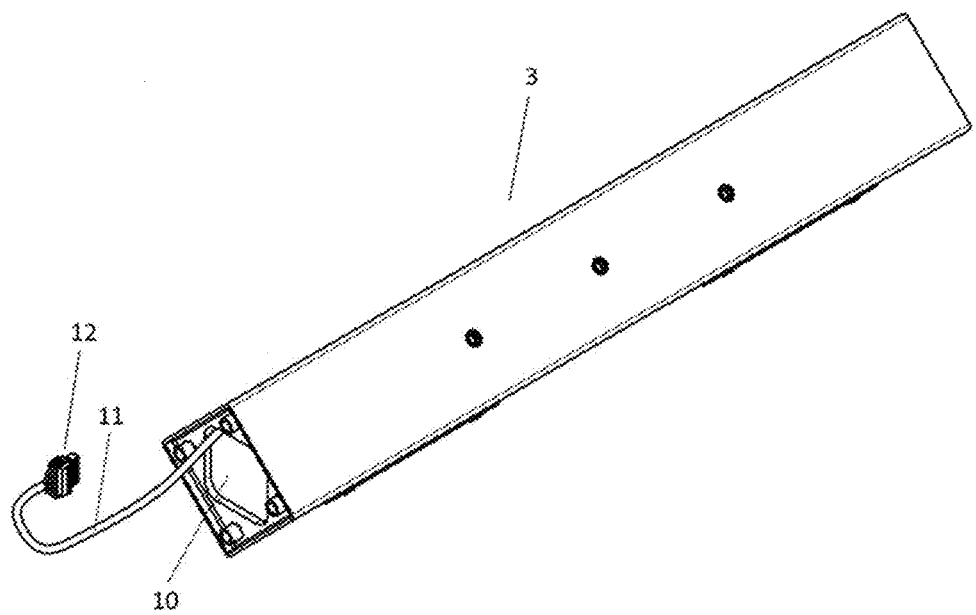
FIG. 4 shows an exemplary implementation of a beam module of the frame of the robotic system.

An embodiment of the frame of a robotic system is shown in FIG. 1. The frame (1) of a robotic system is configured as a modular one and includes at least two support modules (2) made in the form of columns with a cavity, and at least one hollow beam-like module (3). Each support module (2) at least in its upper part is provided with holes (4), which can serve both, for example, to provide an access to the cavity, and to bring out the utility lines (8) (FIG. 3) or accommodate related equipment (displays, indicating panels, control panels, distribution boxes, shields, etc.). Outputs for utilities (9) are disposed inside the cavity of the support module (2). The hollow beam-like module (3) is provided with end holes (10) (FIG. 4) and is configured to attach processing equipment (5) and (6) thereto. Utility lines (11) equipped with outputs (12) are laid inside the beam-like module (3). These outputs (12) can be brought out into the outer space through the end holes (10). The support modules (2) are connected to each other by means of a beam-like module (3), wherein at least part of the holes of the support modules (2) is aligned with the end holes of the beam-like module (3) and is configured to connect utility lines of the beam-like module (3) to the outputs of the support modules (2).

The frame (1) may include a second hollow beam-like module (7). At least one beam-like module (3), (7) of the frame (1) can be provided with additional holes along its length, wherein at least a part of the additional holes may be configured to bring out utility lines. Indication screens, displays, controls for the assembly units of a robotic system and any other equipment known to one skilled in the art and necessary for ensuring convenience and safety of the operation of the robotic system can be installed in these holes connected to utility lines laid inside the modules.

Utility lines configured to be connected to the outputs for utilities also may be laid in the cavity of at least one support module (2) of the frame (1). The support module (2) of the frame (1) with utility lines laid therein may be equipped with at least one additional hole in the lower part configured to bring out the utility lines, and the support module (2) utility lines themselves can be equipped with outputs. Such placement of utilities enables convenient and safe connection of external utilities, for example, in the lower part of the frame (1).

The holes in the support (2) and beam (3) modules may optionally be closed with plugs, covers, glasses, etc.

Figure 2:
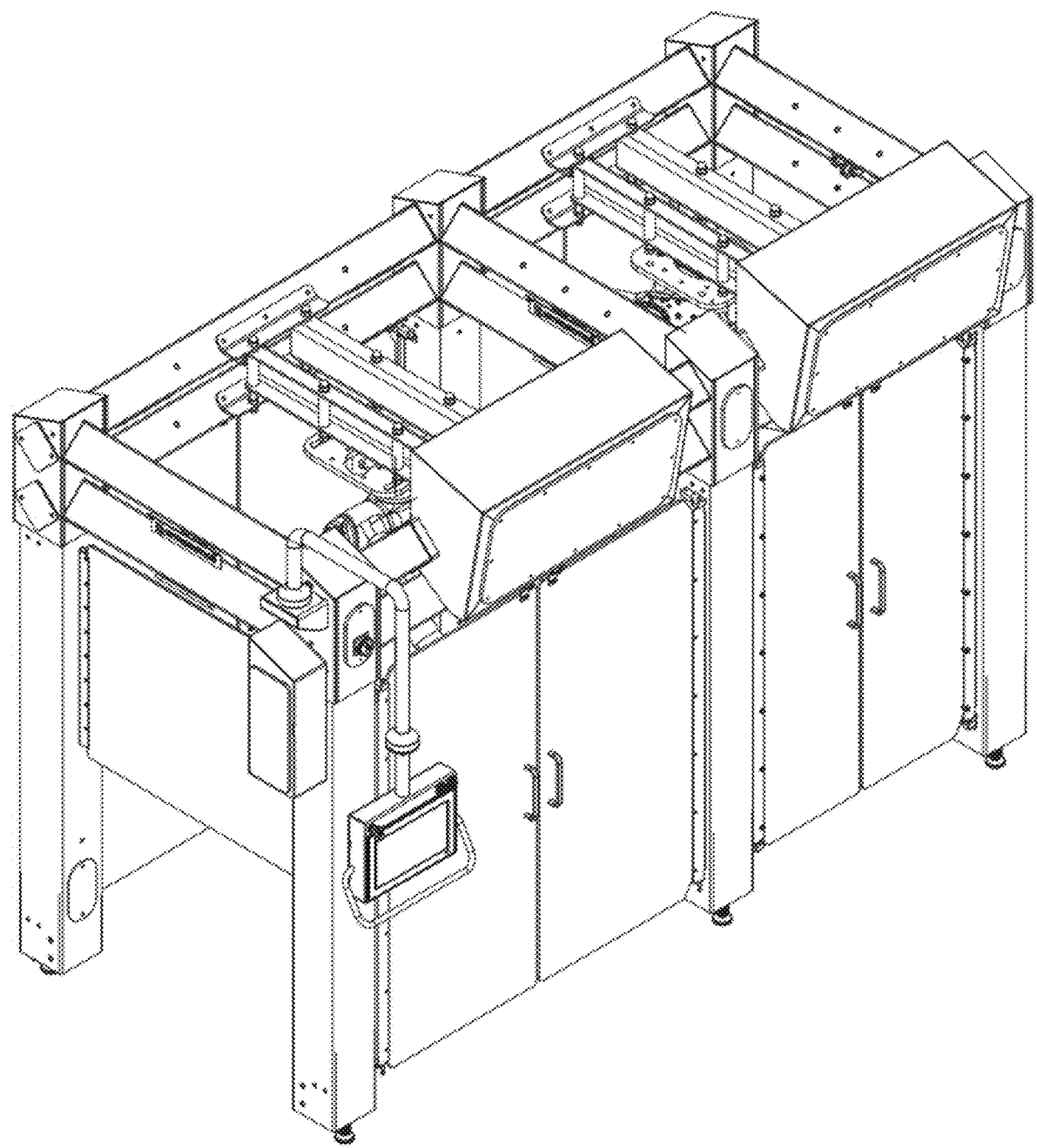
FIG. 2 shows an implementation of the frame of a robotic system.

The frame (1) according to the present disclosure is assembled directly on the production site without stoppage of the production line. Such an assembly is possible due to the modular design, where each module has a relatively small size enabling its delivery directly to the installation site. The support modules (2) of the frame (1) are placed at the installation site according to a preconceived installation plan. Next, the beam-like module (3) is connected to the support modules (2) by means of fasteners using the holes (4) aligned with the end holes (10) of the beam-like module (3). When connecting the beam-like (3) and support (2) modules, for example, via the specified holes, utility lines (8), (11) pre-laid in the modules are also connected by means of the outputs for utilities (9), (12). These operations are performed in accordance with a pre-compiled map of utility lines required by this production. Such operations for mounting the support (2) and beam-like (3) modules are repeated as many times as necessary depending on the tasks set. An example of another implementation of assembling the frame of a robotic system is shown in FIG. 2. Processing equipment, for example, industrial robots, service cabinets and other equipment apparent to those skilled in the art is mounted on the frame being assembled. Using the main and additional holes, various equipment is connected to the outputs for utilities providing control of the robotic system (for example, displays, operator panels, etc.) and informing the maintenance personnel (for example, display panels, sensors, etc.) as well as any other equipment apparent to one skilled in the art. Additionally, protective window and door sections can be installed on the support (2) and/or beam-like (3) modules, which restrict access to the production area and ensure the cleanliness and safety at the production site. Necessary external utilities are connected via additional holes provided in the lower part of the support modules (2) by means of existing outputs. Unused access holes can be closed with plugs, covers, glasses, etc.

The features, structures, or characteristics described above may be combined in one or more embodiments in any suitable manner, and the features discussed in the various embodiments may be interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims.

The terms "first," "second," etc. are used only as labels, rather than a limitation for a number of the objects. It is understood that if multiple components are shown, the components may be referred to as a "first" component, a "second" component, and so forth, to the extent applicable.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A frame of a robotic system, comprising:
    at least two support modules made in the form of columns with a cavity, wherein each support module comprises an upper part and a lower part, each support module is provided with holes at least in the upper part thereof, and outputs for utilities are disposed within the cavity; and
    at least one hollow beam module provided with end holes and configured to receive processing equipment and mount the processing equipment thereon, wherein the at least one hollow beam module is configured to receive a utility line equipped with an output;
    wherein the at least two support modules are connected to each other by means of the at least one hollow beam module such that at least a part of the holes in the at least two support modules is aligned with the end holes in the beam module, and such that the utility line of the at least one hollow beam module is connected to the outputs of the at least two support modules;
    wherein the at least one hollow beam module is a first and a second hollow beam module;
    wherein at least one of the first and the second hollow beam module comprises a plurality of additional holes;
    wherein at least a part of the plurality of additional holes comprises the utility line positioned therethrough;
    wherein the utility line is laid in the cavity of at least one support module; and
    wherein the utility line is laid in a lower part of at least one of the support modules, the lower part of at least one of the support modules comprising at least one additional hole having the utility line positioned therethrough, and the utility line comprising at least one output.

2. The frame according to claim 1, further comprising the processing equipment, the processing equipment being attached to the end holes of the at least one hollow beam module.

3. The frame according to claim 1, wherein the frame is a modular frame comprising a plurality of modular units configured for modular assembly.

4. A modular frame of a robotic system, comprising:
    a plurality of support modules being columns with a cavity; and
    a plurality of hollow beam modules coupling respective pairs of the support modules, each of the hollow beam modules having an upper part provided with at least one hole and a lower part, the at least one hole providing access to the cavity and being configured to have one of a plurality of utility lines positioned therethrough, each of the plurality of hollow beam modules comprising an end hole;
    the utility lines having at least one output disposed within the cavity of the at least two support modules, wherein the at least one output is accessible via the end hole of at least one of the plurality of hollow beam modules;
    wherein the at least one hole of the support modules is aligned with the end hole of the hollow beam modules, the at least one hole being configured to connect the utility lines of the hollow beam modules to an output of the support modules.

5. The modular frame of the robotic system according to claim 4, wherein the at least one hole in the upper part of each of the hollow beam modules accommodates at least one of: a display, an indicating panel, a control panels, a distribution boxes, and an electrical shield.

6. The modular frame of the robotic system according to claim 4, wherein the modular frame comprises a plurality of modular units configured for modular assembly.

7. The modular frame of the robotic system according to claim 4, wherein the hollow beam modules are connected to the support modules by a plurality of fasteners using the holes aligned with the end holes.

8. The modular frame of the robotic system according to claim 4, wherein the utility lines are laid in the hollow beam modules and the support modules.

* * * * *